(12) United States Patent
Ohtsu et al.

(10) Patent No.: US 6,500,589 B1
(45) Date of Patent: Dec. 31, 2002

(54) METHOD FOR MANUFACTURING TFT-INTEGRATED COLOR FILTER USING PHOTOCATALYSIS, COLOR FILTER, AND LIQUID CRYSTAL DISPLAY

(75) Inventors: Shigemi Ohtsu, Nakai-machi (JP); Takao Tomono, Nakai-machi (JP); Keishi Shimizu, Nakai-machi (JP); Eiichi Akutsu, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 241 days.

(21) Appl. No.: 09/656,120

(22) Filed: Sep. 6, 2000

(30) Foreign Application Priority Data

Nov. 12, 1999 (JP) .......................................... 11-322508

(51) Int. Cl.[7] .......................... G02B 5/20; G02F 1/1335
(52) U.S. Cl. .......................... 430/7; 349/106; 427/164; 427/165; 427/595
(58) Field of Search ............................ 430/7; 349/106; 427/164, 165, 169, 595

(56) References Cited

U.S. PATENT DOCUMENTS 5,169,672 A * 12/1992 Harima et al. ................. 427/13
6,294,313 B1 * 9/2001 Kobayashi et al. .......... 430/302
6,309,782 B1 * 10/2001 Ohtsu et al. ..................... 430/7

FOREIGN PATENT DOCUMENTS

| JP | A-59-90818 | 5/1984 |
| JP | A-60-23834 | 2/1985 |
| JP | A-2-24603 | 1/1990 |
| JP | A-5-5874 | 1/1993 |

OTHER PUBLICATIONS

Hoshino et al., *Patterned Pigment Film Formation by Photocatalytic Deposition Method—Effect of Application of Bias Voltage on Film Formation—*, pp. 340–345.

* cited by examiner

Primary Examiner—John A. McPherson
(74) Attorney, Agent, or Firm—Oliff & Berridge, PLC

(57) ABSTRACT

A method for manufacturing a TFT-integrated color filter is provided, which can controllably fabricate a color filter having a high aperture efficiency and a high resolution at low costs without the need for aligning the color filter with a TFT substrate as required by the prior art. The method for manufacturing a thin-film transistor integrated color filter includes the steps of: preparing a color filter fabrication substrate by forming thin-film transistors and light-transmissive pixel electrodes in arrays on a light-transmissive substrate and providing a photocatalytic thin film in contact with the pixel electrodes so that portions of the pixel electrodes are exposed; preparing an electrolytic solution containing a coloring material and another material which may decrease in solubility or dispersibility with respect to an aqueous solution with any change in pH; placing the color filter fabrication substrate in the electrolytic solution so that at least the pixel electrodes and the photocatalytic thin film are in contact with the electrolytic solution; and with predetermined ones of the thin-film transistors driven selectively, illuminating the color filter fabrication substrate with ultraviolet light to form a colored film on the surface of the photocatalytic thin film corresponding to the undriven thin-film transistors.

22 Claims, 6 Drawing Sheets

METHOD FOR MANUFACTURING TFT-INTEGRATED COLOR FILTER USING PHOTOCATALYSIS, COLOR FILTER, AND LIQUID CRYSTAL DISPLAY

BACKGROUND OF THE INVENTION

1. Field of the Invention

The present invention relates to a technology for forming a color filter used for a CCD camera, various display elements such as liquid crystal display elements, or a color sensor, and in particular relates to a method for manufacturing a colored layer or black matrix. More particularly, the present invention relates to a method for manufacturing a new color filter which simply forms such a colored layer or black matrix with high resolution.

2. Discussion of the Related Art

Currently, there are well-known methods for manufacturing a color filter include (1) dyeing, (2) pigment dispersion, (3) printing, (4) ink jet, (5) electrodeposition, and (6) micelle electrolysis.

Among these methods, both the dyeing and pigment dispersion methods listed above in (1) and (2) have reached a substantially complete level in terms of technology and have been used for many color solid-state image sensing devices (CCD). However, these two methods require patterning through a photolithography process, thus resulting in increased process steps at higher costs.

On the contrary, the printing and ink jet methods listed above in (3) and (4) do not require any photolithography process. However, the printing method listed above in (3), in which printing is performed on a thermosetting resin dispersed with pigment and then the resin is cured, is inferior in resolution and uniformity of film thickness. The ink jet method listed above in (4), in which a color filter layer is obtained by forming a particular ink recipient layer, making hydrophilic/hydrophobic portions on its surface through an appropriate process, and then discharging an ink onto the hydrophilic portions, has several problems with resolution and positioning accuracy because it may be more likely that an adjacent filter layer will be improperly colored.

In the electrodeposition method listed above in (5), a color filter layer of R.G.B. is obtained by repeating three times an electropainting process in which a high voltage of approximately 70 V is applied to a previously patterned transparent electrode in an electrolytic solution of water-soluble polymer dispersed with pigment to form an electrodeposition film. This method has disadvantages that patterning is limited to particular shapes and it cannot be used for TFT liquid crystal displays because the transparent electrode must have been previously patterned through a photolithography process for use as an electrode for electrodeposition. No additional patterning would be required if a color filter could be formed integrally with pixel electrodes of a TFT liquid crystal substrate through electrodeposition. However, since a prior electrodeposition method used higher electrodeposition voltages, it was very difficult to cause an active-matrix circuit to produce electrodeposits on transparent pixel electrodes and electrodeposition could not be performed using TFT pixel electrodes.

The micelle electrolysis method listed above in (6) is a kind of electrodeposition but oxidation-reduction reaction of ferrocene used as a deposition material allows the electrodeposition voltage to be reduced and a color filter can be integrally formed on a TFT liquid crystal substrate through electrodeposition. However, since a TFT has a larger internal resistance, some voltage can be applied to it but a large current cannot flow through it. Therefore, it is very difficult to form a color filter directly on pixel electrodes through a TFT drive circuit even if the micelle electrolysis method is used. In addition, a thin film formed through the micelle electrolysis method may contain as impurities ferrocene or a surface-active agent, which is essential to the film forming process but may be incorporated into the film during deposition, and thus, the formed color filter may have decreased transparency. This method has further disadvantages that the manufacturing efficiency will be decreased because it may take several tens minutes to perform electrodeposition and that it requires a higher cost because a ferrocene compound, which is a required component for the electrolytic solution, is very expensive. Moreover, any alkali metal that is required as a supporting salt cannot be used because it may adversely affect a TFT circuit or liquid crystal.

Japanese Patent Laid-Open No. 5-5874 (1993) proposes a method for integrally forming a color filter on a TFT substrate. According to this method, a color filter layer with predetermined pixels of predetermined colors is formed through electrodeposition using a TFT drive circuit. Therefore, this method requires an electrodeposition apparatus and the TFT has a very large internal resistance which may cause voltage drop to prevent a necessary current or voltage from being produced for electrodeposition, and thus, additional electrodes for electrodeposition may be required. In addition, the TFT circuit must be protected against an alkali metal contained in the film and the electrodeposition method requires an electrodeposition solution of higher conductivity and addition of a supporting salt, which may contribute to incorporation of impurities as described above. Moreover, since no typical TFT drive circuit can be used to perform electrodeposition directly on pixel electrodes, another type of TFT is required which has a small internal resistance to allow a high current to flow through it. From these reasons, such a usual electrodeposition technology might be considered very difficult to fabricate a color filter using a TFT drive circuit. Thus, no liquid crystal display element of practical level could be implemented by integrally forming a color filter substrate and a TFT substrate. Japanese Patent Laid-Open No. 59-90818 (1984) describes a method for manufacturing a color filter, comprising the steps of: providing on a transparent substrate electrodes consisting of a conductive transparent thin film divided into a plurality of regions; selecting each electrode and applying a voltage to it for electropainting; and repeating the previous steps to color different electrodes with different colors, and the specification also describes that the method is applicable to switching elements such as TFTs. Japanese Patent Laid-Open No. 60-23834 (1985) describes a method for manufacturing a matrix-type multicolor display device which comprises a plurality of gate lines and a plurality of source lines orthogonal to the gate lines with a thin film transistor array formed at each intersection therebetween, which has a substrate with a display electrode comprising a color filter of a plurality of tones and the drain of the thin film transistor connected thereto and an opposed substrate with an overall conductor formed thereon, and which has a display material sandwiched between the transistor array and the transparent conductor, including the steps of: using conductive portions of the color filter and the transistor array as electrodeposition electrodes; selectively forming a colored film on these conductive portions through electrodeposition in a solution which contains at least electrodeposition polymers and colorants dissolved or dispersed therein; and repeating the previous steps. Japanese Patent Laid-Open No. 2-24603 (1990) describes a method for manufacturing a color filter in obtaining a color filter which has a transparent electrode formed on a transparent substrate according to a predetermined pattern and has an organic pigment layer on the transparent electrode, including the steps of: immersing the substrate and an electrolytic electrode in a solution which contains a non-water-soluble organic pigment solubilized in a micelle solution of a surface-active agent; producing a current flow between the predetermined pattern of the transparent electrode and the electrolytic electrode to cause micelle electrode oxidation on the transparent electrode to deposit organic pigment molecules on the transparent electrode; and repeating the previous steps on other transparent electrode patterns with other organic pigments having different spectral characteristics.

On the other hand, a well-known method for forming a film through optical reaction is the Photocatalytic Deposition Method, which is a kind of micelle electrolysis, and devised by Hoshino of Chiba University. The Photocatalytic Deposition Method is described in detail by Hoshino, Kato, Kurasako, and Kokado in a publication of The Society of Photographic Science and Technology of Japan, Vol. 59, No. 2 (1996). The method uses oxidation-reduction reaction of ferrocene to deposit a film on an unilluminated region but it has disadvantages that it requires application of voltage from an external device, resulting in a complicated apparatus to be used for the method. Therefore, it is unsuitable for forming fine patterns such as color filters.

SUMMARY OF THE INVENTION

The present invention has been made in view of the above circumstances and provides a method for manufacturing a TFT-integrated color filter, which can controllably fabricate a color filter having a high aperture efficiency and a high resolution at low costs without the need for aligning the color filter with a TFT substrate as required by the prior art.

The method for manufacturing the TFT-integrated color filter can be attained by providing a method for manufacturing a color filter and an electrolytic solution therefor as follows:

(1) A method for manufacturing a thin-film transistor integrated color filter is provided, including the steps of: preparing a color filter fabrication substrate by forming thin-film transistors and light-transmissive pixel electrodes in arrays on a light-transmissive substrate and providing a photocatalytic thin film in contact with the pixel electrodes so that portions of the pixel electrodes are exposed; preparing an electrolytic solution containing a coloring material and another material which may decrease in solubility or dispersibility with respect to an aqueous solution with any change in pH; placing the color filter fabrication substrate in the electrolytic solution so that at least the pixel electrodes and the photocatalytic thin film are in contact with the electrolytic solution, and with predetermined ones of the thin-film transistors driven selectively; and illuminating the color filter fabrication substrate with ultraviolet light to form a colored film on the surface of the photocatalytic thin film corresponding to the undriven thin-film transistors.

The method for manufacturing a color filter according to the present invention can controllably fabricate a color filter having a high aperture efficiency and a high resolution at low costs without the need for aligning the color filter with a TFT substrate as required by the prior art because the color filter is formed integrally with the TFT. Therefore, a high-precision liquid crystal display element can be manufactured at low costs by using the color filter.

(2) A method for manufacturing a thin-film transistor integrated color filter is provided, including the steps of: preparing a color filter fabrication substrate by forming thin-film transistors and light-transmissive pixel electrodes in arrays on a light-transmissive substrate and providing a photocatalytic thin film in contact with the pixel electrodes so that portions of the pixel electrodes are exposed; preparing an electrolytic solution containing a coloring material and another material which may decrease in solubility or dispersibility with respect to an aqueous solution with any change in pH; placing the color filter fabrication substrate in the electrolytic solution so that at least the pixel electrodes and the photocatalytic thin film are in contact with the electrolytic solution, with predetermined ones of the thin-film transistors driven selectively; illuminating the color filter fabrication substrate with ultraviolet light to form a colored film on the surface of the photocatalytic thin film corresponding to the undriven thin-film transistors; and repeating the previous steps at one or more times with another electrolytic solution containing another coloring material of a different color.

(3) The method for manufacturing a color filter according to the paragraph (1) or (2) above is provided, wherein the photocatalytic thin film is a thin film containing titanium oxide.

(4) The method for manufacturing a color filter according to any one of the paragraphs (1) through (3) above is provided, wherein the material which may decrease in solubility or dispersibility with respect to an aqueous solution with any change in pH has a carboxyl in the molecule.

(5) The method for manufacturing a color filter according to any one of the paragraphs (1) through (4) above is provided, wherein the material which may decrease in solubility or dispersibility with respect to an aqueous solution with any change in pH is a polymer material.

(6) The method for manufacturing a color filter according to any one of the paragraphs (1) through (5) above is provided, wherein the polymer material is a copolymer of a monomer having hydrophobic groups and hydrophilic groups and the ratio of the number of hydrophobic groups to the total number of hydrophobic and hydrophilic groups is within the range from 40% to 80%.

(7) The method for manufacturing a color filter according to any one of the paragraphs (1) through (6) above is provided, wherein the pH of the electrolytic solution is controlled by a pH adjuster which may not affect the film-deposition characteristics.

(8) The method for manufacturing a color filter according to any one of the paragraphs (1) through (7) above is provided, wherein the conductivity of the electrolytic solution is controlled by a salt which may not affect the film-deposition characteristics.

(9) The method for manufacturing a color filter according to any one of the paragraphs (1) through (8) above is provided, wherein the temperature of the electrolytic solution is controlled.

(10) The method for manufacturing a color filter according to any one of the paragraphs (1) through (9) above is provided, wherein the electrolytic solution contains light-transmissive and conductive particulates.

(11) The method for manufacturing a color filter according to any one of the paragraphs (1) through (10) above is provided, wherein after the colored film is formed, a black matrix is formed by applying a black ultraviolet-curing resin to the surface on which the colored film is formed, illuminating the light-transmissive substrate with ultraviolet light from the side with no colored film, and removing non-curing portions.

(12) A method for manufacturing a thin-film transistor integrated color filter is provided, including the steps of: preparing a color filter fabrication substrate with a black matrix by forming thin-film transistors and light-transmissive pixel electrodes in arrays on a light-transmissive substrate; applying a black positive-working photoresist thereto; illuminating the substrate with light from the side with no thin-film transistors nor light-transmissive pixel electrodes; removing the positive-working photoresist from the illuminated region; and providing a photocatalytic thin film in contact with the pixel electrodes so that portions of the pixel electrodes are exposed, preparing an electrolytic solution containing a coloring material and another material which may decrease in solubility or dispersibility with respect to an aqueous solution with any change in pH, placing the color filter fabrication substrate in the electrolytic solution so that at least the pixel electrodes and the photocatalytic thin film are in contact with the electrolytic solution, with predetermined ones of the thin-film transistors driven selectively, illuminating the color filter fabrication substrate with ultraviolet light to form a colored film on the surface of the photocatalytic thin film corresponding to the undriven thin-film transistors, and repeating the previous steps at one or more times with another electrolytic solution containing another coloring material of a different color.

(13) The method for manufacturing a color filter according to any one of the paragraphs (1) through (10) above is provided, wherein a black matrix is formed in a light-transmissive region with no colored film by applying a black negative-working photoresist to the color filter fabrication substrate after the colored film is formed, illuminating the substrate with light from the side with no colored film, and removing the negative-working photoresist.

(14) The method for manufacturing a color filter according to any one of the paragraphs (1) through (10) above is provided, wherein the gate electrode and the drain electrode of each thin-film transistor are made of a low-reflection material to provide the electrodes with similar functions to those of the black matrix.

(15) The method for manufacturing a color filter according to the paragraph (14) above is provided, wherein the gate electrode and the drain electrode are made of two or three layers of Cr.

(16) The method for manufacturing a color filter according to any one of the paragraphs (1) through (15) above is provided, wherein a light-transmissive conductive thin film is formed on the colored film for continuity with the pixel electrodes.

(17) An electrolytic solution used for the method for manufacturing a color filter according to any one of the paragraphs (1) through (16) above is provided, wherein it contains a coloring material and another material which may decrease in solubility or dispersibility with respect to an aqueous solution with any change in pH.

(18) The electrolytic solution according to the paragraph (17) above is provided, wherein the material which may decrease in solubility or dispersibility with respect to an aqueous solution with any change in pH is a polymer material having a carboxyl and the coloring material is a pigment.

(19) The electrolytic solution according to the paragraph (17) or (18) above is provided, wherein the polymer material is a copolymer of a monomer having hydrophobic groups and hydrophilic groups and the ratio of the number of hydrophobic groups to the total number of hydrophobic and hydrophilic groups is within the range from 40% to 80%.

(20) A method for manufacturing a thin-film transistor integrated color filter is provided, including the steps of: preparing a color filter fabrication substrate by forming thin-film transistors and light-transmissive pixel electrodes in arrays on a light-transmissive substrate and providing a photocatalytic thin film in contact with the pixel electrodes so that portions of the pixel electrodes are exposed; preparing an electrolytic solution containing a coloring material and another material which has a nature that it deposits in a film through a photocatalytic reaction; placing the color filter fabrication substrate in the electrolytic solution so that at least the pixel electrodes and the photocatalytic thin film are in contact with the electrolytic solution, and with predetermined ones of the thin-film transistors driven selectively; illuminating the color filter fabrication substrate with ultraviolet light to form a colored film on the surface of the photocatalytic thin film corresponding to the undriven thin-film transistors.

(21) A method for manufacturing a thin-film transistor integrated color filter is provided, including the steps of: preparing a color filter fabrication substrate by forming thin-film transistors and light-transmissive pixel electrodes in arrays on a light-transmissive substrate and providing a photocatalytic thin film in contact with the pixel electrodes so that portions of the pixel electrodes are exposed; preparing an electrolytic solution containing a coloring material and another material which has a nature that it deposits in a film through a photocatalytic reaction; placing the color filter fabrication substrate in the electrolytic solution so that at least the pixel electrodes and the photocatalytic thin film are in contact with the electrolytic solution, with predetermined ones of the thin-film transistors driven selectively; illuminating the color filter fabrication substrate with ultraviolet light to form a colored film on the surface of the photocatalytic thin film corresponding to the undriven thin-film transistors; and repeating the previous steps at one or more times with another electrolytic solution containing another coloring material of a different color.

(22) A color filter which has thin-film transistors, pixel electrodes, and a colored film formed on a light-transmissive substrate is provided, wherein a photocatalytic thin film is provided in contact with the pixel electrodes so that portions of the pixel electrodes are exposed and the colored film is formed on the photocatalytic thin film.

(23) A liquid crystal display is provided, which has at least a color filter according to the paragraph (22) above, an opposed substrate placed to be opposed to the color filter, and a liquid crystal material sandwiched between the color filter and the opposed substrate.

DETAILED DESCRIPTION OF THE PREFERRED EMBODIMENTS

Figure 1:
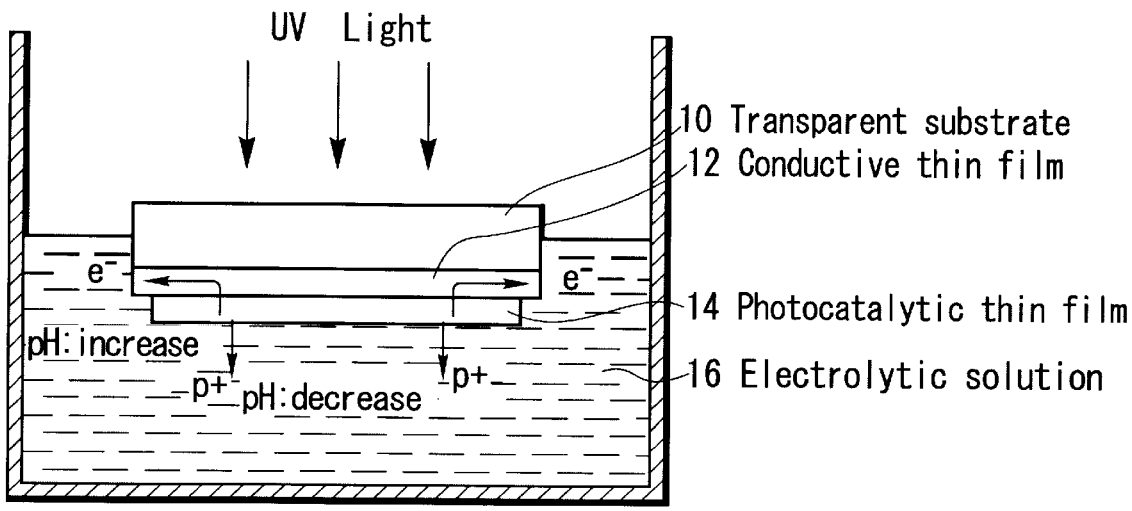
FIG. 1 is a conceptual illustration for showing the principle of depositing a film through a photocatalytic reaction according to the present invention.

The present inventors have previously proposed the photo electrodeposition method as a method for forming a colored film like a color filter, after reviewing the conventional electrodeposition technology in terms of principles and then directing our attention to compounds which may substantially change in solubility with respect to water with the hydrogen ion concentration in the solution. The photo electrodeposition method uses an optical semiconductor as a working electrode, makes it in contact with a solution containing some substance which may decrease in solubility or dispersibility with respect to an aqueous solution with any change in pH, and then illuminates it with light while applying a voltage (bias voltage) between the working electrode and an opposed electrode to deposit a film of the substance on the illuminated portion. When the sum of an electromotive force produced in the optical semiconductor and the bias voltage exceeds a threshold voltage produced through electrolysis of water, the pH of the solution around the working electrode decreases, resulting in a change (decrease) in solubility of the substance which will cause its deposit to form a film on the working electrode surface.

As an example of substances which may decrease in solubility or dispersibility with respect to an aqueous solution with any change in pH, a water-soluble acrylic resin having a carboxyl will be described below. This material is easily dissolved in alkalescent water (pH=8 to 9) and exists as an anion in an aqueous solution but it is insolubilized for deposition if the pH decreases below 7. When a platinum electrode is immersed in the aqueous solution and a current flow through the electrode is produced, OH⁻ ions in the solution around the anode are consumed to turn into $O_2$ with increased hydrogen ions and a decreased pH. This is because a reaction to couple a hole (p) with an OH⁻ ion occurs around the anode as follows:

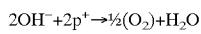

$$2OH^- + 2p^+ \rightarrow \frac{1}{2}(O_2) + H_2O$$

It should be noted that this reaction requires a predetermined voltage.

In the photo electrodeposition method described above, when the sum of an electromotive force produced in the optical semiconductor and the bias voltage exceeds this voltage, the above-mentioned reaction occurs and the hydrogen ion concentration in the solution increases with a decrease in pH as the reaction proceeds. Thus, the water-soluble acrylic resin decreases in solubility around the optical semiconductor (working electrode) to be insolubilized and then a thin film is formed on the electrode.

Recently, the present inventors have found that there is a way other than the use of such an electromotive force in the photo electrodeposition method in order to change the pH (hydrogen ion concentration) of the solution around the optical semiconductor thin film. That is, the photocatalysis of an optical semiconductor such as titanium oxide described below will allow the hydrogen ion concentration to change because water is electrolyzed in the solution in contact with titanium oxide by simply illuminating with light rather than by producing a current flow with an external device like the photo electrodeposition method described above. Therefore, this method can eliminate the need for producing a current flow with an external device to change the hydrogen ion concentration of the solution in contact with titanium oxide and thus certain substance in the solution can deposit as a film.

In connection with electrolysis of water, a phenomenon called "Fujishima and Honda Effect" is well known to those skilled in the art. In this phenomenon, water is electrolyzed to produce hydrogen when titanium oxide having photocatalysis is illuminated with ultraviolet light. A typical technology for applying such a photocatalytic reaction is described in detail in "$TiO_2$ Photocatalysis; its application to self-cleaning, anti-bacterial and air purifying materials" by Hashimoto and Fujishima, CMC, (1998).

However, there has been no technology for forming a thin film through a photocatalytic reaction. Even in the phenomenon called "Fujishima and Honda Effect" described above, wherein water is electrolyzed through a photocatalysis to produce hydrogen, the hydrogen ion concentration in the solution will never change because the oxidation and the reduction concurrently occur and the hydrogen ion concentration never change as a whole. Therefore, this phenomenon has never been linked with film formation.

The method for film formation with a photocatalysis as described above is based on the acquaintance that the hydrogen ion concentration can be changed around the film surface of the photocatalysis by causing either oxidation or reduction on the film surface.

Now, the method for film formation with a photocatalysis according to the present invention will be described below with reference the drawings. FIG. 1 is a conceptual illustration for explaining the method for film formation according to the present invention and in the figure, reference numeral 10 denotes a light-transmissive substrate (which may be simply referred to as "transparent substrate" hereinafter), 12 denotes a light-transmissive conductive thin film (which may be simply referred to as "conductive thin film" hereinafter), and 14 denotes a thin film of a substance having a photocatalysis (which may be simply referred to as "photocatalytic thin film" hereinafter). Reference numeral 16 denotes an electrolytic solution containing a substance which may decrease in solubility or dispersibility with respect to an aqueous solution with any change in pH. As shown in FIG. 1, the photocatalytic thin film 14 and the conductive thin film 12 must be in contact with each other and at least both the conductive thin film 12 and the photocatalytic thin film 14 must be in contact with the electrolytic solution. When the photocatalytic thin film 14 is illuminated with ultraviolet light under these conditions, an internal circuit is formed between the photocatalytic thin film 14 and the conductive thin film 12 and electrolysis will occur without application of a voltage from an external device. In the internal circuit, the conductive thin film acts as a counter electrode and the photocatalytic thin film acts as a working electrode.

Holes produced by illuminating with light move into the solution through the photocatalytic thin film 14. On the other hand, electrons produced by illuminating with light move into the solution through the conductive thin film 12 which is the counter electrode. At this time, an electrolytic reaction of water occurs, resulting in a decrease in pH around the photocatalytic thin film and an increase in pH around the counter electrode. Therefore, the substance which may decrease in solubility with any decrease in pH will deposit on the photocatalytic thin film.

The method for manufacturing a TFT-integrated color filter according to the present invention takes advantage of the novel method for film formation as described above. More specifically, a TFT circuit for driving liquid crystals and light-transmissive pixel electrodes are provided on a light-transmissive substrate in a conventional manner to form a photocatalytic thin film on each pixel electrode. It should be noted that each pixel electrode is not covered with the photocatalytic thin film in whole so that at least a portion of the pixel electrode can be in contact with an electrolytic solution. It should be also noted that the "portion of the pixel electrode" contains the side face of the pixel electrode film. Thus obtained color filter fabrication substrate is placed in the electrolytic solution so that at least the pixel electrodes and the photocatalytic thin film are in contact with the electrolytic solution. A counter electrode connected to the TFT circuit is also placed in the electrolytic solution. Then, the TFT is drivingly controlled and the substrate is illuminated with ultraviolet light from the side with no TFT formed (which may be referred to "backside" hereinafter"). Even if the whole backside is illuminated with ultraviolet light, as described below in detail, film formation is prevented from occurring in whole by drivingly controlling the TFT and is limited to a predetermined region as intended.

That is, the driving control of the TFT is accomplished so that a voltage is applied to the drain electrode of the TFT which is connected to the pixel electrode other than those corresponding to the photocatalytic thin film for forming a colored film. On the surface portion of the photocatalytic thin film in contact with the TFT pixel electrodes with no voltage applied thereto, a photocatalytic reaction occurs and $OH^-$ ions are consumed to decrease the pH, resulting in the film forming material in the electrolytic solution being aggregated into a film. In the TFT with a voltage applied thereto, electrons flow through it and the photocatalytic reaction is suppressed around the photocatalytic thin film in contact with the pixel electrode, resulting in no film formation therein.

Figure 2:
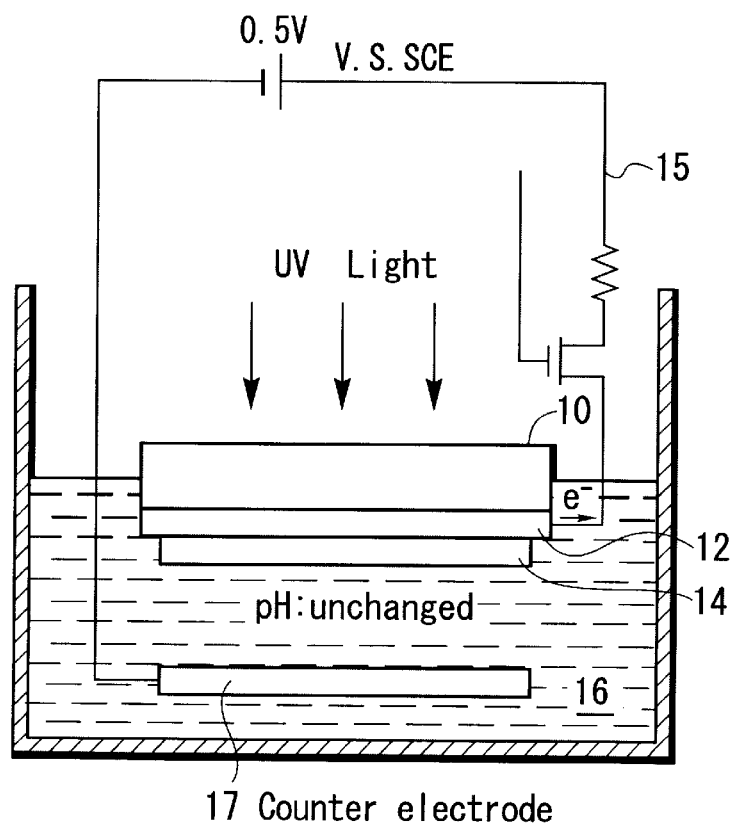
FIG. 2 is a conceptual illustration for showing that the photocatalytic reaction is suppressed when a voltage is applied to a TFT.

FIG. 2 is a conceptual illustration for explaining this reaction. In the figure, the reference numeral 15 shows a TFT drive circuit, 10 denotes a substrate, 12 denotes a conductive film (which is a pixel electrode with no TFT shown), and 14 denotes a photocatalytic thin film. As shown in FIG. 2, when a voltage is applied to the TFT of the pixel electrode to produce an electron flow in the circuit, the photocatalytic reaction is suppressed around the photocatalytic thin film, resulting in no change in pH and no film formation. It should be noted that the reference numeral 17 in FIG. 2 shows a counter electrode of platinum black.

The previous steps are repeated as many times as necessary colors to fabricate a color filter.

Now, the method for manufacturing a TFT-integrated color filter will be described in detail with reference to the drawings.

Figure 3:
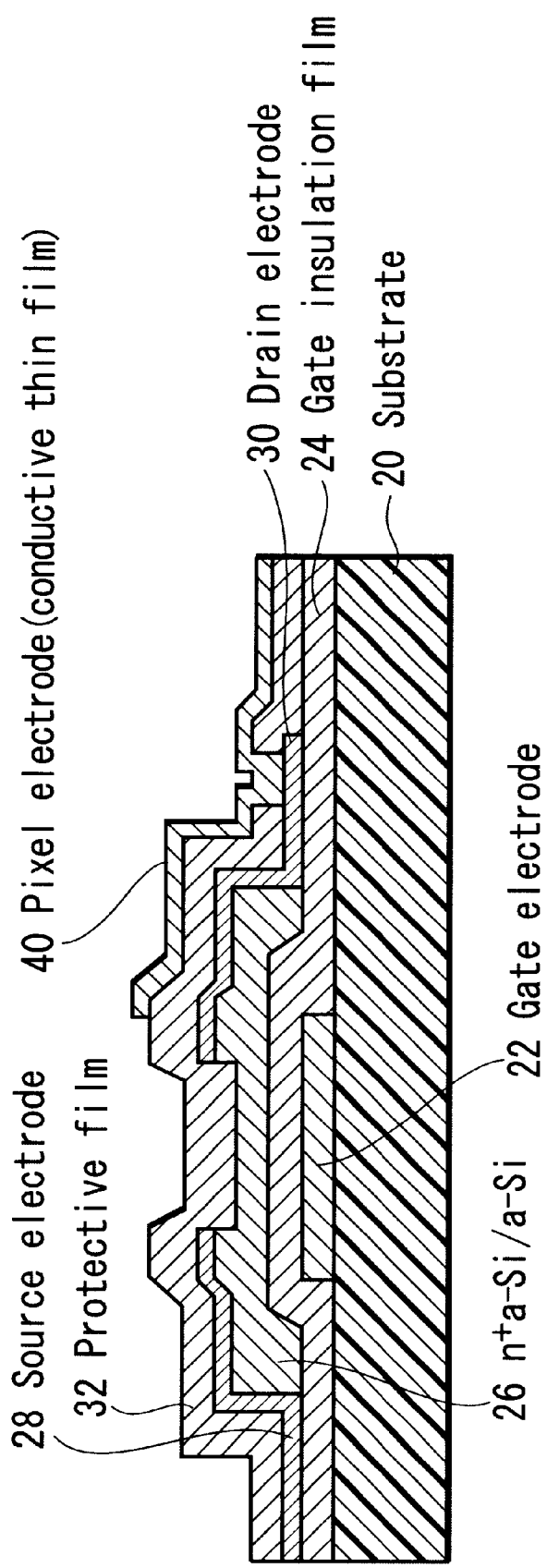
FIG. 3 shows the structure of a reverse stagger channel-embedded TFT.

FIG. 3 shows a cross-section of the structure of a reverse stagger channel-embedded TFT which is most commonly used for a current TFT liquid crystal display and a pixel electrode formed on a substrate. In the figure, reference numeral 20 denotes a light-transmissive substrate, 22 denotes a gate electrode, 24 denotes a gate insulator film, 26 denotes a portion of $n^+a$-Si/a-Si, 28 denotes a source electrode, 30 denotes a drain electrode, 32 denotes a protective film, and 40 shows a pixel electrode.

Figure 4:
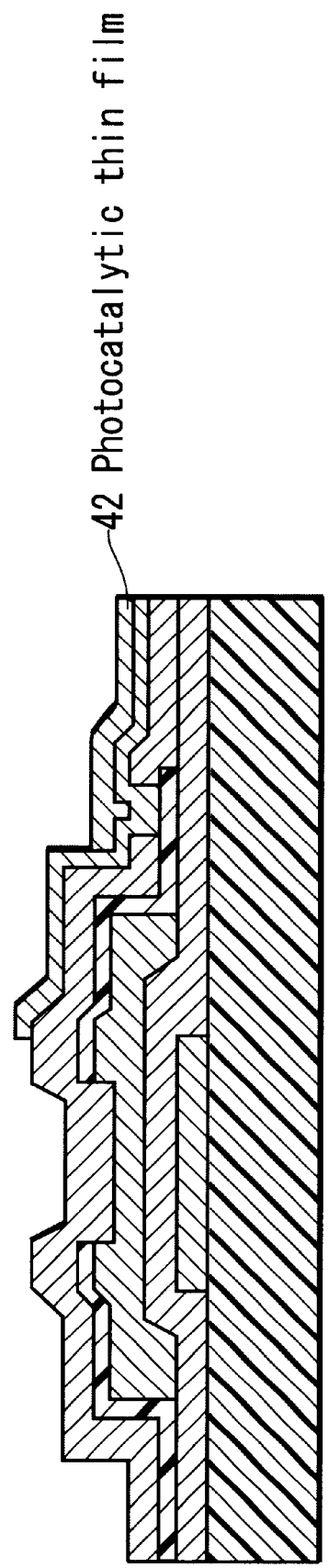
FIG. 4 shows a color filter fabrication substrate which has a photocatalytic thin film provided on a pixel electrode.

On the pixel electrode 40 on the TFT-integrated substrate, a photocatalytic thin film such as a titanium oxide thin film is formed to provide a color filter fabrication substrate. This process is shown in FIG. 4. In FIG. 4, reference numeral 42 denotes a photocatalytic thin film. It should be noted that a portion of the pixel electrode under the photocatalytic thin film is exposed.

As described above, the TFT can withstand only a temperature of up to approximately 250° C. and it cannot be heated to higher temperatures. Therefore, such a titanium oxide thin film is formed through sputtering or electron beam heating or by applying a film forming solution in which photocatalytic titanium oxide particulates are dispersed. The technique of applying such a film forming solution is very easy and preferable. Techniques of providing a titanium oxide thin film on the pixel electrode according to a pattern include, for example, a lift-off method. In the lift-off method, for example, a positive-working photoresist layer is applied in whole to the substrate with the TFT and the pixel electrode provided thereon, then a predetermined photomask is used to illuminate it with light, and the resist layer in a region for titanium oxide formation is removed through etching. Then, as described above, a titanium oxide formation solution is applied in whole and thus obtained titanium oxide thin film outside the region for titanium oxide formation is peeled off together with the resist layer.

Figure 5:
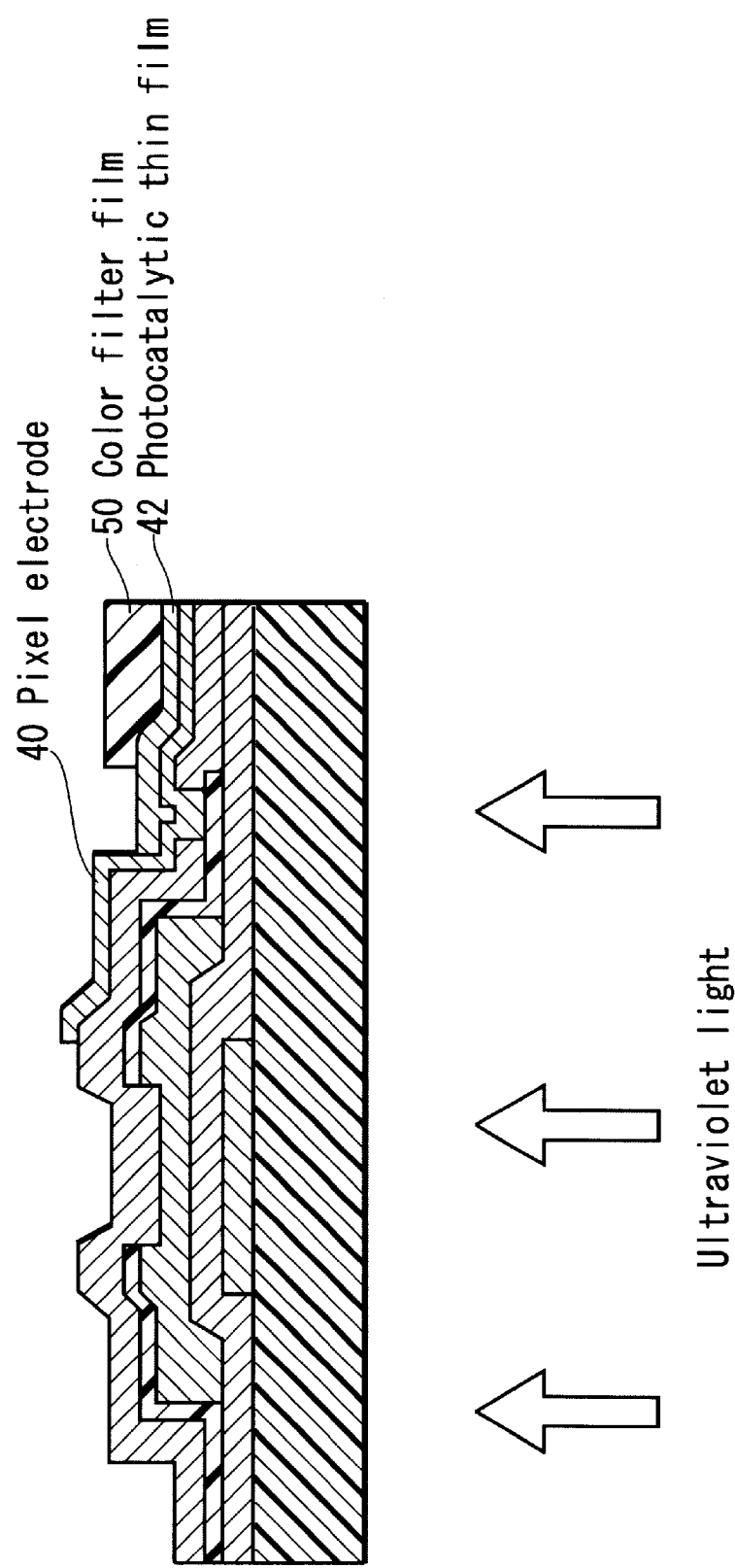
FIG. 5 shows a color filter film formed by illuminating the substrate of FIG. 4 with ultraviolet light.

Next, the color filter fabrication substrate thus obtained is placed in an electrolytic solution as described below so that at least the pixel electrode and the titanium oxide thin film is in contact with the electrolytic solution containing a coloring material. When the TFT is drivingly controlled to apply a voltage to the pixel electrode outside the region for colored film formation (that is, to turn on the gate voltage) and the substrate is illuminated in whole with light from the backside, a colored film deposited through a photocatalytic reaction is formed on the surface of the titanium oxide thin film corresponding to the pixel electrode with no voltage applied thereto. This process is shown in FIG. 5. In FIG. 5, reference numeral 50 denotes a colored film (color filter film). Such a color filter is fabricated by using another coloring material of a different hue in the electrolytic solution to form another colored film of the hue and repeating this step as many times as necessary.

It is preferable that the intensity of light to be used for illumination is within the range from 20 to 200 mW/cm². The reason why the color filter fabrication substrate should be illuminated with ultraviolet light from the backside is that many coloring materials may absorb ultraviolet light by itself and that if the color filter fabrication substrate is illuminated with ultraviolet light from the foreside, that is, through the electrolytic solution for color filter, ultraviolet light may be absorbed into the coloring material. Therefore, if any coloring material which absorbs no or little ultraviolet light is used, the substrate may be illuminated from the foreside.

In general, a color filter is fabricated by forming colored films of red, green, and blue in sequence on a film forming substrate with an electrolytic solution for forming such colored films.

The method for manufacturing a color filter according to the present invention is characterized in that addressing to the photocatalytic thin film for colored film formation is accomplished by drivingly controlling the TFT. Therefore, the present method can eliminate the need for a photomask and the light source may radiate parallel or radial rays of light at a constant intensity.

Next, the light-transmissive substrate, the light-transmissive pixel electrode, and the photocatalytic thin film constituting the color filter fabrication substrate used for manufacturing a color filter according to the present invention will be described below.

The light-transmissive substrate according to the present invention can transmit visible light and includes a plate, sheet, or film made of, for example, glass, polyethylene terephthalate, polyethylene naphthalate, polyethersulfone, polyether imide, polyether ketone, polyphenylene sulfide, polyarylate, polyimide, or polycarbonate or the like.

The light-transmissive pixel electrode to be provided on the light-transmissive substrate acts as a counter electrode with respect to the photocatalytic thin film which acts as a working electrode in the method for film formation according to the present invention and preferably consists of an ITO film.

Titanium oxide is preferably used as a photocatalysis. It is desirable that titanium oxide should be in the form of anatase in order to have a photocatalytic operation but it may be in the form of rutile.

Several ways of forming a titanium oxide film are known to those skilled in the art. For example, thermal oxidation film, sputtering, electron-beam (EB), and sol-gel are well-known techniques but a titanium oxide film formed through the conventional sputtering or EB technique may not be considered to have the photocatalytic effect sufficiently. Thus, to enhance the photocatalytic effect, it is recommendable to perform a reduction process. The reduction process is accomplished by heating it in a hydrogen gas. For example, a cold and short process wherein heating is kept at approximately 330° C. for 10 minutes while a nitrogen gas containing hydrogen at 3% is flowing at a flow rate of 1l/min may produce a sufficient effect.

It should be noted that as described above, when a substrate with a thin-film transistor (TFT) element provided thereon is used for film formation according to the present invention, the characteristics of TFT prevent the substrate from being heated higher than 250° C. and thus, the sol-gel technique which requires sintering at 500° C. cannot be used for that substrate. Instead, the sputtering or electron-beam technique or a thin-film forming solution in which photocatalytic titanium oxide particulates are dispersed (available from TOTO Ltd. or Nippon Soda Co., Ltd.) can be used for forming a titanium oxide thin film at low temperatures.

It is preferable that the thickness of a photocatalytic thin film is within the range from 0.05 to 3 $\mu$m because acceptable characteristics can be obtained. For example, the light absorption characteristics may be insufficient if the thickness is less than 0.05 $\mu$m, and the film forming characteristics may be impaired due to cracking or other defects if the thickness is larger than 3 $\mu$m.

Next, the electrolytic solution used for the method for manufacturing a color filter according to the present invention will be described below. It is preferable that the electrolytic solution for a color filter according to the present invention contains a coloring material and another material which may decrease in solubility or dispersibility with respect to an aqueous solution with any change in pH. The coloring material itself may be a material which may decrease in solubility or dispersibility with respect to an aqueous solution with any change in pH. That is, at least one of the materials contained in the electrolytic solution for a color filter must have this nature. It is preferable that any material which may decrease in solubility or dispersibility with respect to an aqueous solution with any change in pH contains a substance having in its molecule a group whose ionic dissociation changes with any change in pH of the solution (ionic group) such as a carboxyl or an amino group. For example, any material which may decrease in solubility or dispersibility with respect to an aqueous solution with any change in pH such as those used for the photo electrodeposition method previously proposed can be basically used for the present invention.

A film forming material contained in the electrolytic solution according to the present invention does not necessarily require to be a polymer material for film formation but it is preferable that a polymer material is used from the viewpoint of the film strength of a color filter. It is preferable that the polymer material can decrease in solubility or dispersibility with respect to the electrolytic solution with any change in pH of the solution to form a film. Therefore, the polymer material does not necessarily require to contain an ionic group in its molecule but it is preferable that a polymer having a carboxyl or any other anionic group from the viewpoint of film deposition.

First, as an example of polymer materials which may decrease in solubility or dispersibility with respect to the electrolytic solution with any change in pH of the solution to form a film, a polymer material having an anionic group in its molecule will be described below.

Such an ionic polymer must have a sufficient solubility or dispersibility with respect to any watery liquid (including a pH adjusted watery liquid) as well as a certain light transmissivity. It is preferable that the liquid characteristics of the ionic polymer vary within a range of 2 in pH when it turns from the dissolved or dispersed form to the form of deposit with supernatant liquor as the electrolytic solution changes in pH. If the pH varies within the range of 2, it can instantaneously deposit and produce an image even when a steep change in pH occurs due to a current flow. Moreover, the resulting image has a high cohesion and may be redissolved into the electrodeposition solution very slowly. This allows a filter layer to obtain a high transmissivity and water resistance.

If the pH varies outside the range of 2, it may be more likely that the display speed will be too slow to produce a sufficient image or that the water resistance of the image will be reduced. In order to obtain more desirable characteristics, it is preferable that the pH varies within the range of 1.

It is also preferable that the ionic polymer is a polymer having in its molecule hydrophilic groups and hydrophobic groups which can accelerate insolubilization with respect to water. A hydrophobic group also provides the polymer with a function to instantaneously deposit a film in cooperation with another hydrophobic group which is turned from a hydrophilic group due to any change in pH as described above. In addition, the hydrophobic group has the ability to absorb organic pigments because it exhibits a strong compatibility with organic pigments used as coloring materials in the method for color filter formation as described below, and provides the polymer with a good pigment dispersing quality.

It is preferable that when the polymer has hydrophobic groups and hydrophilic groups, the ratio of the number of hydrophobic groups to the total number of hydrophobic and hydrophilic groups is within the range from 40% to 80%. If the ratio of the number of hydrophobic groups to the total number of hydrophobic and hydrophilic groups is less than 40%, a film formed from the polymer may be more easily redissolved and the water resistance and strength of the film may be reduced. If the ratio of the number of hydrophobic groups to the total number of hydrophobic and hydrophilic groups is more than 80%, the polymer may have insufficient dissolubility into a watery liquid, resulting in a muddy electrolytic solution, electrolyte deposition, or an increase in viscosity of the electrolytic solution. Therefore, it is preferable that the ratio is within the above-mentioned range. Moreover, the ratio of the number of hydrophobic groups to the total number of hydrophobic and hydrophilic groups is preferably within the range from 55% to 70%. Any polymer which meets this requirement can provide a good film-deposition efficiency and a stable electrolytic solution.

It should be noted that the ionic polymer having an acid value within the range from 60 to 300 could provide good film-deposition characteristics. Especially, the range from 90 to 195 may produce much better film-deposition characteristics. If a polymer material has an acid value of less than 60, it may have insufficient dissolubility into a watery liquid, resulting in a solid content in the electrolytic solution less than a proper value, a muddy electrolytic solution, electrolyte deposition, or an increase in viscosity of the electrolytic solution. If a polymer material has an acid value of more than 300, a film formed from the material may be easily redissolved.

An electrolytic solution in which the polymer material is dissolved must have hysteresis characteristics that it can steeply provide film deposition due to any change in hydrogen ion concentration (pH) and it cannot be easily redissolved. These characteristics allow a thin film to be formed due to any change in pH and once the thin film is formed, these characteristics may prevent the film from being redissolved into the electrolytic solution and allow the film formation to continue.

Monomer materials containing hydrophilic groups and used as a polymer material in the manufacturing method according to the present invention include methacrylic acid, acrylic acid, hydroxyethyl methacrylate, acrylamide, maleic anhydride, trimellitic acid anhydride, phthalic anhydride, hemimellitic acid, succinic acid, adipic acid, propiolic acid, propionic acid, fumaric acid, itaconic acid, and their derivatives. Among others, methacrylic acid and acrylic acid are useful hydrophilic monomer materials because they have a good film-deposition efficiency with respect to a pH change.

Monomer materials containing hydrophobic groups and used as a polymer material include alkyl, styrene, α-methyl styrene, α-ethyl styrene, methyl methacrylate, butyl methacrylate, acrylonitrile, vinyl acetate, ethyl acrylate, butyl acrylate, lauryl methacrylate, and their derivatives. Among others, styrene and α-methyl styrene are useful hydrophobic monomer materials because they have such hysteresis characteristics that they are not easily redissolved due to their strong hydrophobic nature.

Water-soluble polymers used herein are polymer materials obtained by copolymerizing molecules containing hydrophilic and hydrophobic groups at the ratio described above and the types of hydrophilic and hydrophobic groups contained are not limited to one, respectively. Any polymer material having a degree of polymerization within the range from 6000 to 25000 and prefereably, the range from 9000 to 20000 will provide good film deposition. If the degree of polymerization is lower than 6000, that material maybe easily redissolved. If the degree of polymerization is higher than 25000, that material may have insufficient dissolubility into a watery liquid, resulting in a muddy electrolytic solution or electrolyte deposition.

A polymer containing hydrophilic and hydrophobic groups in its molecule can be manufactured, for example, by copolymerizing a monomer having hydrophobic groups and another monomer having hydrophilic groups. It is preferable that the copolymerization produces a random copolymer. It should be noted that one or more types of hydrophilic and hydrophobic groups can be combined, respectively.

In addition, it is preferable that a colorless or light-colored ionic polymer is used for manufacturing a color filter.

Dyes and pigments can be used as coloring materials to be added to an electrolytic solution according to the present invention. Such dyes and pigments themselves do not necessarily require to decrease in solubility or dispersibility with any change in pH of the electrolytic solution. Then, components other than coloring materials which have that nature described above, for example, polymers will cohere and deposit in a film and thus pigmentize the film. Dyes which may decrease in solubility or dispersibility with any change in pH of the solution include ionic dyes. In addition, ionic dyes can be used in combination with pigments.

Such ionic dyes include triphenylmethane phthalide, phenothazine, phenothiazine, fluorescein, indolyl phthalide, spilopyran, azaphthalide, diphenylmethane, chromenol pyrazole, leucoharmine, azomethine, rhodamine lactam, naphtholactam, triazine, triazole azo, thiazole azo, azo, oxazine, thiazine, benzthiazole azo, and quinone imine dyes, and hydrophilic dyes having a carboxyl, amino group, or imino group. For example, rose bengal or eosine which is a fluorescein colorant can be dissolved in water if the pH is 4 or higher but it will deposit in neutral state if the pH is lower than 4. Similarly, a diazo dye, Pro Jet Fast Yellow2, can be dissolved in water if the pH is 6 or higher but it will deposit if the pH is lower than 6.

It should be appreciated that well-known red, green, and blue pigments may be used unconditionally but the hue of a pigment can be more reproducible if its grain size is smaller. When manufacturing a color filter, it is preferable that the average grain size of a pigment is 200 $\mu$m or less, and preferably 100 $\mu$m from the viewpoint of transparency and dispersibility of a color filter layer.

Coloring materials for a color filter also include those proposed by the present inventors in Japanese Patent Application Nos. 9-268642 (1997) and 9-329798 as suitable materials for electrodeposition.

It should be further noted that two or more coloring materials could be used to produce a mixed color.

Therefore, an electrolytic solution in which a pigment is dispersed with polymer materials having anionic groups is preferably used for the present invention.

If any film forming material other than coloring materials contained in an electrolytic solution used for the present invention has no ionicity in itself and does not decrease in solubility with any change in pH of the electrolytic solution, it can be used as intended in combination with ionic molecules such as ionic polymers and ionic dyes described above. While ionic molecules cohere and deposit in a film, such a material will be incorporated together with the ionic molecules to form a film. That is, if a mixture is used as a film forming material, it will suffice that at least one of the molecules contained therein varies in solubility with any change in pH and allows a thin film to be formed.

It should be noted that film-deposition materials to be contained in an electrolytic solution according to the present invention can include any combination of those described above, for example, a mixture of homopolar molecules such as a mixture of two or more anionic molecules, or a mixture of heteropolar molecules such as a mixture of an anionic molecule and a cationic molecule.

In the foregoing, materials which may decrease in solubility or dispersibility with respect to an aqueous solution with any change in pH, and mainly, materials having ionic groups in their molecules have been described. However, any film-deposition material does not necessarily require the existence of an ionic group. For example, consider a mixture of two different ions. In general, when a basic solution and an acid solution are mixed for neutralization, a complex or other deposition will be produced and precipitated. Therefore, it is a common way to use nonpolar pigments or disperse homopolar materials in order to produce a mixed color from two different colorants. However, some dyes may be mixed to cause different ions to coexist rather than to produce a complex. Then, deposition can be suppressed even when a basic solution and an acid solution are mixed and thus, any materials can be used regardless of ion polarity.

In the method for manufacturing a color filter according to the present invention, film-deposition materials to be contained in an electrolytic solution are not limited to those which may decrease in solubility or dispersibility with respect to an aqueous solution with any change in pH as described above. That is, the electrolytic solution according to the present invention contains coloring materials and any electrolytic solution containing a material which forms a film on a photocatalytic thin film through a photocatalytic reaction can be used unconditionally.

It should be noted that the deposition efficiency of the electrolytic solution used for the present invention could be improved by adding a supporting salt to increase the conductivity. Such a supporting salt is one commonly used for electrochemistry and includes an alkali metal salt such as NaCl or KCl, a tetraalkylammonium salt such as tetraethylammonium perchlorate ($Et_nNClO_4$), tetramethylammonium perchlorate ($Me_4NClO_4$), tetraethylammonium chloride ($Et_4NCl$), tetramethylammonium chloride ($Me_4NCl$), tetra-n-butylammonium perchlorate ($n-Bu_4NClO_4$), tetraethylammonium bromide ($Et_4NBr$), tetra-n-butylammonium bromide ($n-Bu_4NBr$), or tetraethylammonium tetrafluorobromide ($Et_4NBF_4$), or an ammonium halide ion such as $NH_4Cl$.

However, when a film is formed on a substrate provided with a thin-film transistor (TFT), an alkali metal salt among various salts described above cannot be used because it may adversely affect the characteristics of the thin-film transistor. Then, it is preferable that an ammonium halide ion such as $NH_4Cl$ or a tetraalkylammonium salt such as $Me_4NCl$, $Me_4NClO_4$, $n-Bu_4NClO_4$, $Me_4NBF_4$, $ME_4NBr$, or $n-Bu_4Br$ is used instead.

Of course, the pH of an electrolytic solution may affect thin film formation. For example, if a saturated solution of film-deposition molecules is used for film deposition, those molecules will not be easily redissolved after a film has been formed. However, if an unsaturated solution is used, a formed film will be redissolved as soon as the light illumination stops after the film has been formed. Therefore, it is desirable that the pH level corresponds to such a saturated solution and thus, the electrolytic solution must be adjusted to a desired pH by using some acid or alkali.

When a film is formed on a substrate provided with a thin-film transistor (TFT), an alkali metal salt cannot be used for similar reasons to those described above. Therefore, amine or ammonium organic alkali materials will be used instead. In many cases, tetramethyl hydroxide is used as an etchant for photoresist and can be preferably used for the present invention because it has a good compatibility with the thin-film transistor.

In addition, it is preferable that a black matrix is formed on a TFT circuit of a TFT-integrated color filter. The optical density of the black matrix must be usually 2.5 or more to prevent light leakage.

Since the gate and source electrodes of the TFT circuit originally have an excellent capability for blocking the transmission of light, the gate and source electrodes formed of a low-reflection metal film, for example, a two-layer Cr film can eliminate the need for a separate black matrix because the electrodes and the power line will double as a black matrix after a color filter has been formed. Then, the aperture efficiency of the color filter can be maximized and a very light high-definition liquid crystal display element can be obtained.

Before a colored film is formed, a black matrix can be formed through a conventional photolithography process wherein, for example, a black negative-working photoresist is applied, a photomask for a black matrix is used to illuminate with ultraviolet light, and then unilluminated portions are removed through etching. Alternatively, after a colored film has been formed, a black matrix can be formed through another process wherein a black negative-working photoresist is applied to the colored film surface in whole, the substrate is illuminated with light from the side with no colored film to form a black film in regions of the substrate where light transmits through the substrate, and the photoresist in uncured regions is removed. Therefore, well-known methods for forming a black matrix can be used unconditionally.

Figure 6:
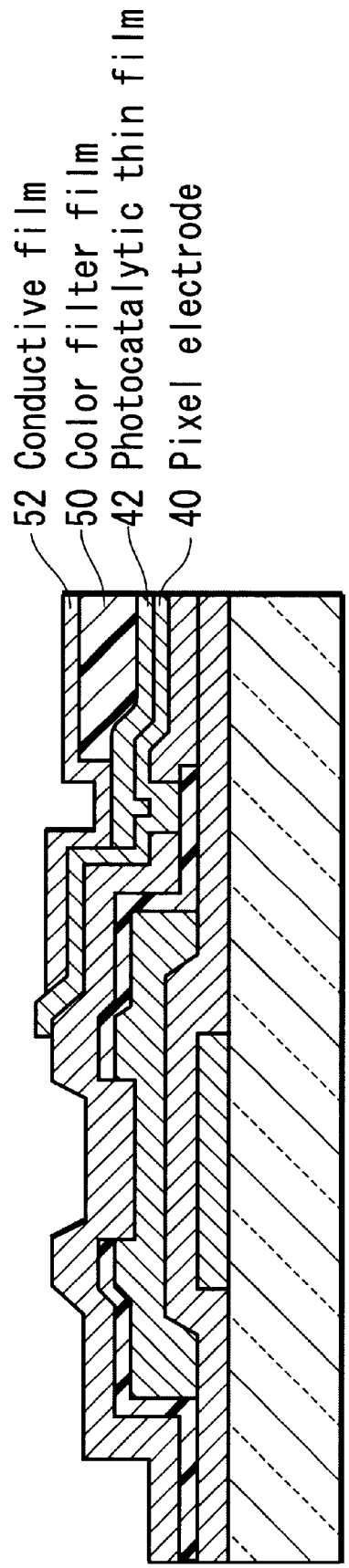
FIG. 6 shows a conductive film formed on the color filter film.

Since a colored film for a color filter has good insulation properties, it is preferable that as shown in FIG. 6, a light-transmissive conductive film 52 is formed on the color filter film 50 and used as a liquid crystal display electrode. The liquid crystal display electrode 52 is formed to be in contact with the pixel electrode 40 provided on the color filter fabrication substrate for continuity with the drain electrode of the TFT.

Instead of the use of the liquid crystal display electrode, the color filter layer may be made conductive. For example, such a conductive film can be obtained by adding ITO, $SnO_2$, or any other transparent conductive particulates having a grain size of several tens A to an electrolytic solution for forming a color filter and performing the film-forming process as usual. It is preferable that, for example, ITO particulates are added at a ratio of 5 to 50 wt % with respect to a film-forming material (solid content).

From the foregoing, the method for manufacturing a color filter according to the present invention can controllably fabricate a color filter having a high aperture efficiency and a high resolution at low costs without the need for aligning the color filter with a TFT substrate as required by the prior art because the color filter is formed integrally with the TFT. Therefore, a high-precision liquid crystal display element can be manufactured at low costs by using the color filter.

In addition, the present invention can eliminate the need for an expensive exposure apparatus because the colored film forming process is directly controlled by driving the TFT and therefore, a cheap uniform illumination light source can be used to fabricate a color filter with a larger area. The formed film can have excellent uniformity of film thickness because the present invention does not require any application of voltage from an external device.

A color filter film fabricated by the present manufacturing method can keep its color purity and transmissivity because it contains no impurities such as a surface-active agent unlike an electrodeposition film obtained through the micelle electrolysis method.

The present invention also relates to a color filter which has thin-film transistors, pixel electrodes, and a colored film formed on a light-transmissive substrate and in the color filter, a photocatalytic thin film is provided in contact with the pixel electrodes so that portions of the pixel electrodes are exposed and the colored film is formed on the photocatalytic thin film.

Figure 7:
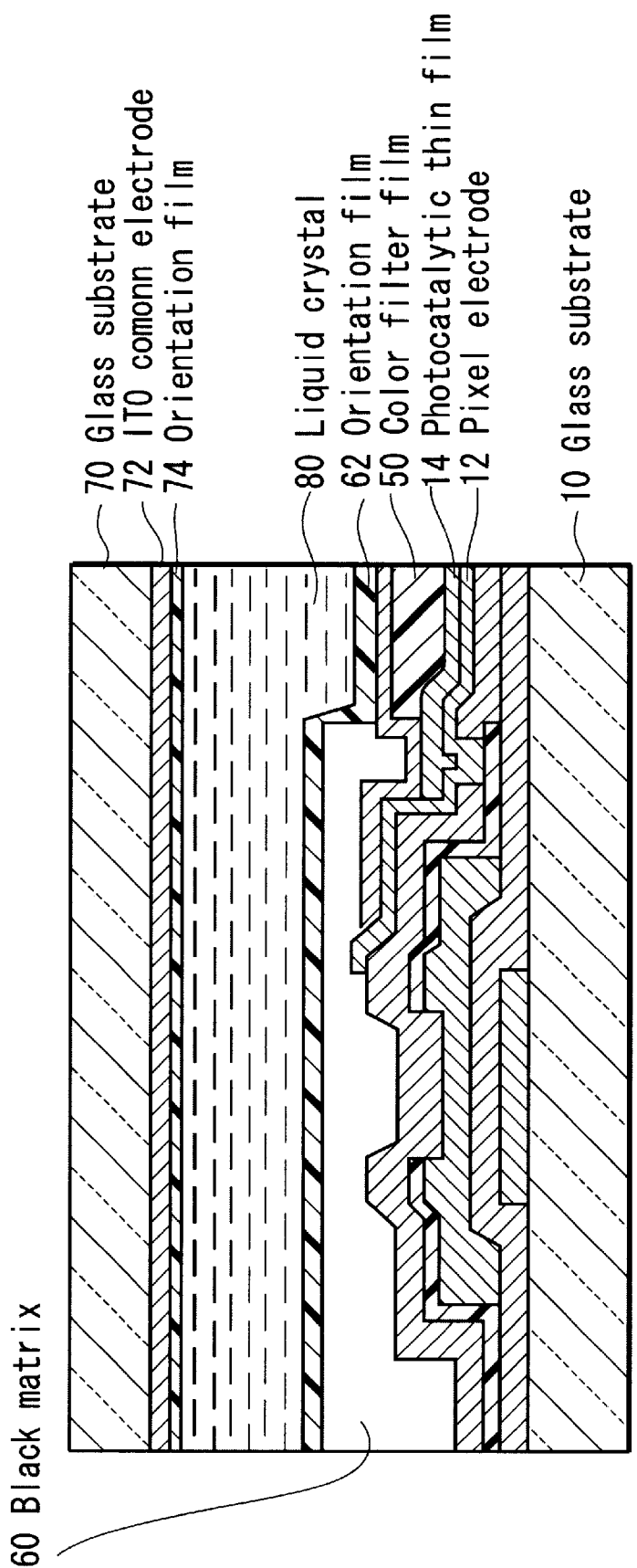
FIG. 7 shows an example of a liquid crystal display according to the present invention.

The present invention also relates to a liquid crystal display which uses the color filter described above and the present liquid crystal display has at least the color filter, an opposed substrate placed to be opposed to the color filter, and a liquid crystal material sandwiched between the color filter and the opposed substrate. FIG. 7 shows an example of the liquid crystal display, in which a color filter comprises a pixel electrode 12, a photocatalytic thin film 14 provided to expose a portion of the pixel electrode 12, a color filter layer 50 formed on the photocatalytic thin film, and a black matrix 60, an orientation film 62 is formed on the color filter, a glass substrate 70, an ITO common electrode 72, and an orientation film 74 are placed to be opposed to the color filter, and a liquid crystal 80 is sandwiched between the color filter and the opposed substrate.

Embodiments

Now, the present invention will be described below in detail with reference to several embodiments but it should be noted that the present invention should not be limited to these embodiments. In the following description, unless otherwise specified, the term "backside" means the side of a liquid crystal display substrate with no thin-film transistor (TFT).

First Embodiment

<Fabricating a Liquid Crystal Display Substrate>

As shown in FIG. 1, a thin-film transistor (TFT) and a transparent conductive (ITO) pixel electrode were formed on a non-alkali glass substrate of 0.7 mm thick (1737 glass manufactured by Corning Inc.) in a conventional manner. The gate and drain electrodes of the TFT were formed of two-layer chromium, so that the electrodes and the power line could double as a black matrix after a color filter layer has been formed.

Next, a titanium oxide thin film was formed only on the pixel electrode through the lift-off method. A titanium oxide solution used for this process was cold-curing Bistorater L (NDC100C manufactured by Nippon Soda Co., Ltd.). After the solution was applied to the electrode in whole, it was dried at 70° C. It should be noted that as shown in the figure, a portion of the pixel electrode was exposed to be in contact with an electrolytic solution. The exposed portion was also used to provide a through-hole in a transparent electrode and the TFT on a colored film after that colored film has been formed (this holds true for the second embodiment described below).

<Forming a Red Film>

Next, the liquid crystal display substrate was placed in an electrolytic solution (pH=7.8, conductivity=10 mS/cm) of a solid content of 10 wt % in which a styrene-acrylic acid copolymer (molecular weight: 13000, molar ratio of hydrophobic groups/(hydrophilic groups+hydrophobic groups): 65%, acid value: 150) and a red ultrafine pigment were dispersed at a solid content weight ratio of resin/pigment of 0.7 so that at least the titanium oxide thin film and the ITO thin film were in contact with the electrolytic solution. The gate electrodes of the TFTs in a predetermined region were drivingly controlled so that a voltage of 5 V was applied only to those gate electrodes, and thus a voltage was applied to the pixel electrode. Then, the substrate was illuminated in whole with DeepUV light (intensity: 50 mW/cm$^2$) for 1 minute from the backside. For this purpose, a uniform illumination light source (Hg—Xe lamp manufactured by Yamashita Denso, 1 KW) was used. As a result, a red film was formed on the titanium oxide film in the region corresponding to the pixel electrodes with the gate turned OFF. Then, the substrate was washed with pure water.

<Forming a Green Film>

Another electrolytic solution (pH=7.8, conductivity=10 mS/cm) of a solid content of 10 wt % in which a styrene-acrylic acid copolymer (molecular weight: 13000, molar ratio of hydrophobic groups/(hydrophilic groups+hydrophobic groups): 65%, acid value: 150) and a phthalocyanine green ultrafine pigment were dispersed at a solid content weight ratio of resin/pigment of 0.5 was prepared. The substrate was placed in the electrolytic solution so that the films were in contact with the electrolytic solution in the same manner as for the red film. The TFTs were drivingly controlled in the similar manner to that described above and the substrate was illuminated with DeepUV light on the same conditions. As a result, a green film was formed on the titanium oxide film in the region corresponding to the pixel electrodes with the gate turned OFF. Then, the substrate was washed with pure water.

<Forming a Blue Film>

Still another electrolytic solution (pH=7.8, conductivity=10 mS/cm) of a solid content of 10 wt % in which a styrene-acrylic acid copolymer (molecular weight: 13000, molar ratio of hydrophobic groups/(hydrophilic groups+hydrophobic groups): 65%, acid value: 150) and a phthalocyanine blue ultrafine pigment were dispersed at a solid content weight ratio of resin/pigment of 0.7 was prepared. The substrate was placed in the electrolytic solution so that the films were in contact with the electrolytic solution in the same manner as for the red film. The TFTs were drivingly controlled in the similar manner to that described above and the substrate was illuminated with DeepUV light on the same conditions. As a result, a blue film was formed on the titanium oxide film in the region corresponding to the pixel electrodes with the gate turned OFF. Then, the substrate was washed with pure water.

Finally, a transparent electrode of ITO was formed on the color filter layer and connected with the ITO transparent electrode via the through-hole previously provided.

Through the sequence of process steps described above, a full-color TFT-integrated color filter with the red, green, and blue films formed on the predetermined pixel electrodes was fabricated. Since the gate and drain electrodes of a TFT were formed of two-layer chromium as described above, the electrode and the power line might double as a black matrix sufficiently and thus, the need for a separate black matrix can be eliminated.

Second Embodiment

<Fabricating a Liquid Crystal Display Substrate>

As shown in FIG. 1, a thin-film transistor (TFT) and a transparent conductive (ITO) pixel electrode were formed on a non-alkali glass substrate of 0.7 mm thick (1737 glass manufactured by Corning Inc.) in a conventional manner.

Next, a titanium oxide thin film was formed only on the pixel electrode through the lift-off method. A titanium oxide solution used for this process was cold-curing Bistorater L (NDC100C manufactured by Nippon Soda Co., Ltd.). After the solution was applied to the electrode in whole, it was dried at 70° C. It should be noted that as shown in the figure, a portion of the pixel electrode was exposed to be in contact with an electrolytic solution.

<Forming a Red Film>

Next, the liquid crystal display substrate was placed in an electrolytic solution (pH=7.8, conductivity=10 mS/cm) of a solid content of 10 wt % in which a styrene-acrylic acid copolymer (molecular weight: 13000, molar ratio of hydrophobic groups/(hydrophilic groups+hydrophobic groups): 65%, acid value: 150) and a red ultrafine pigment were dispersed at a solid content weight ratio of resin/pigment of 0.7 so that at least the titanium oxide thin film and the ITO thin film were in contact with the electrolytic solution. The gate electrodes of the TFTs in a predetermined region were drivingly controlled so that a voltage of 5 V was applied only to those gate electrodes, and thus a voltage was applied to the pixel electrode. Then, the substrate was illuminated in whole with DeepUV light (intensity: 50 mW/cm$^2$) for 1 minute from the backside. For this purpose, a uniform illumination light source (Hg—Xe lamp manufactured by Yamashita Denso, 1 KW) was used. As a result, a red film was formed on the titanium oxide film in the region corresponding to the pixel electrodes with the gate turned OFF. Then, the substrate was washed with pure water.

<Forming a Green Film>

Another electrolytic solution (pH=7.8, conductivity=10 mS/cm) of a solid content of 10 wt % in which a styrene-acrylic acid copolymer (molecular weight: 13000, molar ratio of hydrophobic groups/(hydrophilic groups+ hydrophobic groups): 65%, acid value: 150) and a phthalocyanine green ultrafine pigment were dispersed at a solid content weight ratio of resin/pigment of 0.5 was prepared. The substrate was placed in the electrolytic solution so that the films were in contact with the electrolytic solution in the same manner as for the red film. The TFTs were drivingly controlled in the similar manner to that described above and the substrate was illuminated with DeepUV light on the same conditions. As a result, a green film was formed on the titanium oxide film in the region corresponding to the pixel electrodes with the gate turned OFF. Then, the substrate was washed with pure water.

<Forming a Blue Film>

Still another electrolytic solution (pH=7.8, conductivity= 10 mS/cm) of a solid content of 10 wt % in which a styrene-acrylic acid copolymer (molecular weight: 13000, molar ratio of hydrophobic groups/(hydrophilic groups+ hydrophobic groups): 65%, acid value: 150) and a phthalocyanine blue ultrafine pigment were dispersed at a solid content weight ratio of resin/pigment of 0.7 was prepared. The substrate was placed in the electrolytic solution so that the films were in contact with the electrolytic solution in the same manner as for the red film. The TFTs were drivingly controlled in the similar manner to that described above and the substrate was illuminated with DeepUV light on the same conditions. As a result, a blue film was formed on the titanium oxide film in the region corresponding to the pixel electrodes with the gate turned OFF. Then, the substrate was washed with pure water.

<Forming a Black Matrix>

An ultraviolet-curing resin containing carbon black was applied to the substrate in whole on the side with the red, green, and blue films formed thereon. Then, the substrate was illuminated with ultraviolet light from the backside with no ultraviolet-curing resin applied thereto. The black ultraviolet-curing resin cured only in the region where ultraviolet light could pass through the glass substrate. The ultraviolet-curing resin was washed off with acetone from the substrate in other regions.

Finally, a transparent electrode of ITO was formed on the color filter layer and connected with the ITO transparent electrode via the through-hole previously provided.

Through the sequence of process steps described above, a full-color TFT-integrated color filter with the red, green, and blue films as well as the black matrix layer formed on the predetermined pixel electrodes was fabricated.

Third Embodiment

<Fabricating a Liquid Crystal Display Substrate>

As shown in FIG. 1, a thin-film transistor (TFT) and a transparent conductive (ITO) pixel electrode were formed on a non-alkali glass substrate of 0.7 mm thick (1737 glass manufactured by Corning Inc.) in a conventional manner. The gate and drain electrodes of the TFT were formed of two-layer chromium, so that the electrodes and the power line could double as a black matrix after a color filter layer has been formed.

Next, a titanium oxide thin film was formed only on the pixel electrode through the lift-off method. A titanium oxide solution used for this process was cold-curing Bistorater L (NDC100C manufactured by Nippon Soda Co., Ltd.) After the solution was applied to the electrode in whole, it was dried at 70° C. It should be noted that as shown in the figure, a portion of the pixel electrode was exposed to be in contact with an electrolytic solution.

<Forming a Red Film>

Next, the liquid crystal display substrate was placed in an electrolytic solution (pH=7.8, conductivity=10 mS/cm) of a solid content of 10 wt % in which a styrene-acrylic acid copolymer (molecular weight: 13000, molar ratio of hydrophobic groups/(hydrophilic groups+hydrophobic groups): 65%, acid value: 150), a red ultrafine pigment, and ITO particulates (grain size: approximately 50 nm) were dispersed at a solid content weight ratio of 1:1:1 so that at least the titanium oxide thin film and the ITO thin film were in contact with the electrolytic solution. The gate electrodes of the TFTs in a predetermined region were drivingly controlled so that a voltage of 5 V was applied only to those gate electrodes, and thus a voltage was applied to the pixel electrode.

Then, the substrate was illuminated in whole with DeepUV light (intensity: 50 mW/cm$^2$) for 1 minute from the backside. For this purpose, a uniform illumination light source (Hg—Xe lamp manufactured by Yamashita Denso, 1 KW) was used. As a result, a red film was formed on the titanium oxide film in the region corresponding to the pixel electrodes with the gate turned OFF. Then, the substrate was washed with pure water.

<Forming a Green Film>

Another electrolytic solution (pH=7.8, conductivity=10 mS/cm) of a solid content of 10 wt % in which a styrene-acrylic acid copolymer (molecular weight: 13000, molar ratio of hydrophobic groups/(hydrophilic groups+ hydrophobic groups): 65%, acid value: 150), a phthalocyanine green ultrafine pigment, and ITO particulates (grain size: approximately 50 nm) were dispersed at a solid content weight ratio of 1:1:1 was prepared. The substrate was placed in the electrolytic solution so that the films were in contact with the electrolytic solution in the same manner as for the red film. The TFTs were drivingly controlled in the similar manner to that described above and the substrate was illuminated with DeepUV light on the same conditions. As a result, a green film was formed on the titanium oxide film in the region corresponding to the pixel electrodes with the gate turned OFF. Then, the substrate was washed with pure water.

<Forming a Blue Film>

Still another electrolytic solution (pH=7.8, conductivity= 10 mS/cm) of a solid content of 10 wt % in which a styrene-acrylic acid copolymer (molecular weight: 13000, molar ratio of hydrophobic groups/(hydrophilic groups+ hydrophobic groups): 65%, acid value: 150), a phthalocyanine blue ultrafine pigment, and ITO particulates (grain size: approximately 50 nm) were dispersed at a solid content weight ratio of 1:1:1 was prepared. The substrate was placed in the electrolytic solution so that the films were in contact with the electrolytic solution in the same manner as for the red film. The TFTs were drivingly controlled in the similar manner to that described above and the substrate was illuminated with DeepUV light on the same conditions. As a result, a blue film was formed on the titanium oxide film in the region corresponding to the pixel electrodes with the gate turned OFF. Then, the substrate was washed with pure water. Through the sequence of process steps described above, a full-color TFT-integrated color filter with the red, green, and blue films formed on the predetermined pixel electrodes was fabricated. Since the gate and drain electrodes of a TFT were formed of two-layer chromium as described above, the electrode and the power line might double as a black matrix sufficiently and thus, the need for a separate black matrix can be eliminated.

In addition, since conductive transparent particulates of ITO were dispersed in the color filter layer according to this embodiment, the conductivity of the color filter layer can be improved and thus, any voltage drop which may occur when the liquid crystal display is driven can be suppressed. Therefore, the need for an additional conductive film formed on the color filter film can be eliminated.

Fourth Embodiment

A color filter (a matrix substrate for a liquid crystal display) was obtained by forming an orientation film of polyimide on the TFT-integrated color filter formed according to the second embodiment in a conventional manner. Then, a common electrode of ITO was formed on the glass substrate and an orientation film of polyimide was formed on the common electrode to produce an opposed substrate in the similar manner to that described above. The color filter and the opposed substrate were layered with a spacer placed therebetween to form airspace. Then, the airspace was filled with liquid crystal to produce a liquid crystal display element as shown in FIG. 7.

From the foregoing, the method for manufacturing a color filter according to the present invention can controllably fabricate a color filter having a high aperture efficiency and a high resolution at low costs without the need for aligning the color filter with a TFT substrate as required by the prior art because the color filter is formed integrally with the TFT. Therefore, a high-precision liquid crystal display element can be manufactured at low costs by using the color filter.

In addition, the present invention can eliminate the need for an expensive exposure apparatus because the colored film forming process is directly controlled by driving the TFT and therefore, a cheap uniform illumination light source can be used to fabricate a color filter with a larger area. The formed film can have excellent uniformity of film thickness because the present invention does not require any application of voltage from an external device.

What is claimed is:

1. A method for manufacturing a thin-film transistor integrated color filter, comprising the steps of:

preparing a color filter fabrication substrate by forming thin-film transistors and light-transmissive pixel electrodes in arrays on a light-transmissive substrate and providing a photocatalytic thin film in contact with the pixel electrodes so that portions of the pixel electrodes are exposed;

preparing an electrolytic solution containing a coloring material and another material which may decrease in solubility or dispersibility with respect to an aqueous solution with any change in pH;

placing the color filter fabrication substrate in the electrolytic solution so that at least the pixel electrodes and the photocatalytic thin film are in contact with the electrolytic solution; and with predetermined ones of the thin-film transistors driven selectively, illuminating the color filter fabrication substrate with ultraviolet light to form a colored film on the surface of the photocatalytic thin film corresponding to the undriven thin-film transistors.

2. The method for manufacturing a color filter according to claim 1, wherein the photocatalytic thin film is a thin film containing titanium oxide.

3. The method for manufacturing a color filter according to claim 1, wherein the material which may decrease in solubility or dispersibility with respect to an aqueous solution with any change in pH has a carboxyl group in the molecule.

4. The method for manufacturing a color filter according to claim 1, wherein the material which may decrease in solubility or dispersibility with respect to an aqueous solution with any change in pH is a polymer material.

5. The method for manufacturing a color filter according to claim 4, wherein the polymer material is a copolymer of a monomer having hydrophobic groups and hydrophilic groups and the ratio of the number of hydrophobic groups to the total number of hydrophobic and hydrophilic groups is within the range form 40% to 80%.

6. The method for manufacturing a color filter according to claim 1, wherein the pH of the electrolytic solution is controlled by a pH adjustor which may not affect the film-deposition characteristics.

7. The method for manufacturing a color filter according to claim 1, wherein the conductivity of the electrolytic solution is controlled by a salt which may not affect the film-deposition characteristics.

8. The method for manufacturing a color filter according to claim 1, wherein the temperature of the electrolytic solution is controlled.

9. The method for manufacturing a color filter according to claim 1, wherein the electrolytic solution contains light-transmissive and conductive particles.

10. The method for manufacturing a color filter according to claim 1, wherein after the colored film is formed, a black matrix is formed by applying a black ultraviolet-curing resin to the surface on which the colored film is formed, illuminating the light-transmissive substrate with ultraviolet light from the side with no colored film, and removing non-curing portions.

11. The method for manufacturing a color filter according to claim 1, wherein a black matrix is formed in a light-transmissive region with no colored film by applying a black negative-working photoresist to the color filter fabrication substrate after the colored film is formed, illuminating the substrate with light from the side with no colored film, and removing the negative-working photoresist.

12. The method for manufacturing a color filter according to claim 11, wherein a gate electrode and a drain electrode of each thin-film transistor are made of a low-reflection material to provide the electrodes with similar functions to those of the black matrix.

13. The method for manufacturing a color filter according to claim 12, wherein the gate electrode and the drain electrode are made of two or three layers of Cr.

14. The method for manufacturing a color filter according to claim 1, wherein a light-transmissive conductive thin film is formed on the colored film for continuity with the pixel electrodes.

15. The method for manufacturing a color filter according to claim 1, wherein the material which may decease in solubility or dispersibility with respect to an aqueous solution with any change in pH is a polymer material having a carboxyl group and the coloring material is a pigment.

16. The method for manufacturing a color filter according to claim 15, wherein the polymer material is a copolymer of a monomer having hydrophobic groups and hydrophilic groups and the ratio of the number of hydrophobic groups to the total number of hydrophobic and hydrophilic groups is within the range from 40% to 80%.

17. A method for manufacturing a thin-film transistor integrated color filter, comprising the steps of:

preparing a color filter fabrication substrate by forming thin-film transistors and light-transmissive pixel electrodes in arrays on a light-transmissive substrate and providing a photocatalytic thin film in contact with the pixel electrodes so that portions of the pixel electrodes are exposed;

preparing an electrolytic solution containing a coloring material and another material which may decrease in solubility or dispersibility with respect to an aqueous solution with any change in pH;

placing the color filter fabrication substrate in the electrolytic solution so that at least the pixel electrodes and the photocatalytic thin film are in contact with the electrolytic solution;

with predetermined ones of the thin-film transistors driven selectively, illuminating the color filter fabrication substrate with ultraviolet light to form a colored film on the surface of the photocatalytic thin film corresponding to the undriven thin-film transistors; and repeating the previous steps at one or more times with another electrolytic solution containing another coloring material of a different color.

18. A method for manufacturing a thin-film transistor integrated color filter, comprising the steps of:

preparing a color filter fabrication substrate with a black matrix by forming thin-film transistors and light-transmissive pixel electrodes in arrays on a light-transmissive substrate;

applying a black positive-working photoresist thereto;

illuminating the substrate with light from the side with no thin-film transistors nor light-transmissive pixel electrodes;

removing the positive-working photoresist from the illuminated region;

providing a photocatalytic thin film in contact with the pixel electrodes so that portions of the pixel electrodes are exposed;

preparing an electrolytic solution containing a coloring material and another material which may decrease in solubility or dispersibility with respect to an aqueous solution with any change in pH;

placing the color filter fabrication substrate in the electrolytic solution so that at least the pixel electrodes and the photocatalytic thin film are in contact with the electrolytic solution;

with predetermined ones of the thin-film transistors driven selectively, illuminating the color filter fabrication substrate with ultraviolet light to form a colored film on the surface of the photocatalytic thin film corresponding to the undriven thin-film transistors; and repeating the previous steps at one or more times with another electrolytic solution containing another coloring material of a different color.

19. A method for manufacturing a thin-film transistor integrated color filter, comprising the steps of:

preparing a color filter fabrication substrate by forming thin-film transistors and light-transmissive pixel electrodes in arrays on a light-transmissive substrate and providing a photocatalytic thin film in contact with the pixel electrodes so that portions of the pixel electrodes are exposed;

preparing an electrolytic solution containing a coloring material and another material which has a nature that it deposits in a film through a photocatalytic reaction;

placing the color filter fabrication substrate in the electrolytic solution so that at least the pixel electrodes and the photocatalytic thin film are in contact with the electrolytic solution; and with predetermined ones of the thin-film transistors driven selectively, illuminating the color filter fabrication substrate with ultraviolet light to form a colored film on the surface of the photocatalytic thin film corresponding to the undriven thin-film transistors.

20. A method for manufacturing a thin-film transistor integrated color filter, comprising the steps of:

preparing a color filter fabrication substrate by forming thin-film transistors and light-transmissive pixel electrodes in arrays on a light-transmissive substrate and providing a photocatalytic thin film in contact with the pixel electrodes so that portions of the pixel electrodes are exposed;

preparing an electrolytic solution containing a coloring material and another material which has a nature that it deposits in a film through a photocatalytic reaction;

placing the color filter fabrication substrate in the electrolytic solution so that at least the pixel electrodes and the photocatalytic thin film are in contact with the electrolytic solution;

with predetermined ones of the thin-film transistors driven selectively, illuminating the color filter fabrication substrate with ultraviolet light to form a colored film on the surface of the photocatalytic thin film corresponding to the undriven thin-film transistors; and repeating the previous steps at one or more times with another electrolytic solution containing another coloring material of a different color.

21. A color filter having thin-film transistors, pixel electrodes, and a colored film formed on a light-transmissive substrate, wherein a photocatalytic thin film is provided in contact with the pixel electrodes so that portions of the pixel electrodes are exposed and the colored film is formed on the photocatalytic thin film.

22. A liquid crystal display having at least a color filter according to claim 21, an opposed substrate placed to be opposed to the color filter, and a liquid crystal material sandwiched between the color filter and the opposed substrate.

* * * * *